(12) United States Patent
Siraisi et al.

(10) Patent No.: US 12,459,734 B2
(45) Date of Patent: Nov. 4, 2025

(54) ARTICLE STORAGE FACILITY

(71) Applicant: Daifuku Co., Ltd., Osaka (JP)

(72) Inventors: Tooru Siraisi, Tokyo (JP); Tooru Arii, Tokyo (JP); Takehito Ito, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 549 days.

(21) Appl. No.: 18/018,135

(22) PCT Filed: May 18, 2021

(86) PCT No.: PCT/JP2021/018836
§ 371 (c)(1),
(2) Date: Jan. 26, 2023

(87) PCT Pub. No.: WO2022/024509
PCT Pub. Date: Feb. 3, 2022

(65) Prior Publication Data
US 2023/0271779 A1 Aug. 31, 2023

(30) Foreign Application Priority Data

Jul. 27, 2020 (JP) ................................. 2020-126205

(51) Int. Cl.
*B65G 1/04* (2006.01)
(52) U.S. Cl.
CPC ................. *B65G 1/0492* (2013.01)
(58) Field of Classification Search
CPC ... B65G 1/0492; B65G 1/0435; B65G 1/0485
See application file for complete search history.

(56) References Cited

U.S. PATENT DOCUMENTS

2018/0178979 A1* 6/2018 Bretz ................... B65G 1/0407

FOREIGN PATENT DOCUMENTS

| JP | 797006 A | | 4/1995 |
|---|---|---|---|
| JP | 2007238302 A | * | 9/2007 |
| JP | 2013023302 A | * | 2/2013 |
| JP | 2013049507 A | * | 3/2013 |

* cited by examiner

*Primary Examiner* — Jacob S. Scott
*Assistant Examiner* — Erin Morris
(74) *Attorney, Agent, or Firm* — The Webb Law Firm

(57) ABSTRACT

A specific transfer mode is a mode for causing a transport device to execute a first transfer operation, a travel operation, and a second transfer operation in this order. The first transfer operation is transferring a second article from a storage region to the transport device with use of a second transfer device, and thereafter transferring a first article from the storage region to the transport device with use of a first transfer device. The travel operation is traveling to a position corresponding to a boundary between a relay section and a temporary placement region while holding the first article and the second article. The second transfer operation is transferring the first article from the transport device to the relay section with use of the first transfer device, and transferring the second article from the transport device to the temporary placement region with use of the second transfer device.

4 Claims, 7 Drawing Sheets

ARTICLE STORAGE FACILITY

CROSS-REFERENCE TO RELATED APPLICATIONS

This application is the United States national phase of International Application No. PCT/JP2021/018836 filed May 18, 2021, and claims priority to European Patent Application No. 2020-126205 filed Jul. 27, 2020, the disclosures of which are hereby incorporated by reference in their entireties.

BACKGROUND OF THE INVENTION

Field of the Invention

The present invention relates to an article storage facility including: an article storage rack including a storage section in which a plurality of articles are storable next to each other in a depth direction; a relay device configured to transport an article between a loading/unloading section and a relay section; and a transport device configured to transport an article between the relay section and the storage section.

Description of Related Art

JP H07-97006A (Patent Document 1) discloses an example of an article storage facility that includes an article storage rack in which a plurality of articles are storable next to each other in the depth direction. In the following description of background art, reference numerals shown in parentheses are those used in Patent Document 1. The article storage facility described in Patent Document 1 includes a storage rack (7) in which two articles (8, 9) are storable next to each other in the depth direction and a work transport facility (3) configured to transport the stored articles (8, 9) between a loading/unloading port (6) and the storage rack (7). The work transport facility (3) includes two loading/unloading facilities (4, 5) that are arranged in a width direction of the storage rack (7) and configured to place the articles (8, 9) into the storage rack (7) and take the articles (8, 9) out of the storage rack (7). As described in paragraph 0015 of Patent Document 1, when unloading an article (9) stored on the rear side in the article storage facility without unloading an article (8) stored on the front side, the work transport facility (3) takes out the front-side article (8) with use of a first loading/unloading facility (4) and thereafter takes out the rear-side article (9) with use of a second loading/unloading facility (5). Then, the work transport facility (3) returns the front-side article (8) to the storage rack (7) with use of the first loading/unloading facility (4) and thereafter travels to the loading/unloading port (6) to carry out the rear-side article (9) to the loading/unloading port (6).

PATENT DOCUMENTS

Patent Document 1: JP H07-97006A

As described in paragraph 0003 of Patent Document 1, sometimes there arises an urgent need to unload an article stored in an article storage rack (in Patent Document 1, an article stored in the storage rack). In a case where the article that is to be unloaded (hereinafter referred to as a "first article") is behind (on the rear side of) another article (hereinafter referred to as a "second article") that is not to be unloaded in the article storage rack of the article storage facility described in Patent Document 1, the second article and the first article are taken out from the article storage rack in this order, the second article is then returned to the article storage rack, and thereafter the first article is carried out to a relay section (in Patent Document 1, the loading/unloading port) for unloading articles, as described above. Therefore, the time it takes until the first article is carried out to the relay section increases due to the time it takes to return the second article to the article storage rack, and there is room for improvement in reducing the time it takes until the first article is carried out to the relay section. It is desirable to reduce the time it takes until the first article is carried out to the relay section while improving the efficiency of transporting articles in the entire facility.

SUMMARY OF THE INVENTION

Under the above circumstances, it is desired to realize a technology that makes it possible to reduce the time it takes until an article to be unloaded is carried out to the relay section when the article to be unloaded is behind another article that is not to be unloaded in the article storage rack, while improving the efficiency of transporting articles in the entire facility.

An article storage facility according to the present disclosure includes: an article storage rack including a storage section in which a plurality of articles are storable next to each other in a depth direction; a loading/unloading section that is on a first side in a width direction of the article storage rack relative to the storage section and through which an article is carried in and carried out; a relay device configured to transport an article between the loading/unloading section and a relay section that is between the loading/unloading section and the storage section in the width direction; a transport device configured to travel in the width direction on a front side in the depth direction relative to the storage section and transport an article between the storage section and the relay section; and a control device configured to control operations of the transport device, in which the transport device includes a plurality of transfer devices that are next to each other in the width direction, are capable of transferring articles to the storage section and the relay section, and include a first transfer device and a second transfer device, a region in the storage section on the first side in the width direction is a temporary placement region, and a region in the storage section on a side opposite to the first side in the width direction relative to the temporary placement region is a storage region, the control device is configured to be capable of switching a control mode of the transport device to a specific transfer mode in a case where a first article that is to be unloaded from the article storage rack is arranged next to a second article that is not to be unloaded from the article storage rack, on a rear side of the second article in the storage region, the rear side being opposite to the front side in the depth direction, the specific transfer mode is a mode for causing the transport device to execute a first transfer operation, a travel operation, and a second transfer operation in this order, the first transfer operation is an operation of transferring the second article from the storage region to the transport device with use of the second transfer device, and thereafter transferring the first article from the storage region to the transport device with use of the first transfer device, the travel operation is an operation of traveling to a position corresponding to a boundary between the relay section and the temporary placement region while holding the first article and the second article, and the second transfer operation is an operation of transferring the first article from the transport device to the relay section with use of the first transfer device, and transferring the second article from the transport device to the temporary placement region with use of the second transfer device.

According to this configuration, the control mode of the transport device can be switched to the specific transfer mode in the case where the first article that is to be unloaded from the article storage rack is arranged next to the second article that is not to be unloaded from the article storage rack, on the rear side of the second article in the storage region of the storage section in the article storage rack. In the specific transfer mode, it is possible to transfer the second article and the first article in this order from the storage section to the transport device, then cause the transport device holding the second article as well as the first article to travel to the position (hereinafter referred to as a "boundary corresponding position") corresponding to the boundary between the relay section and the temporary placement region, and transfer the first article from the transport device to the relay section and transfer the second article from the transport device to the temporary placement region. As described above, in the specific transfer mode, either one of: a position of the transport device for transferring the first article to the relay section; and a position of the transport device for transferring the second article to the temporary placement region can be set as the boundary corresponding position, and the other position can be set to the boundary corresponding position or a position near the boundary corresponding position. Therefore, when compared with a case where the position of the transport device for transferring the second article, which is not to be unloaded, to the storage section (i.e., returning the second article to the storage section) is far from the boundary corresponding position, the transport device can more quickly travel to the position for transferring the first article to the relay section and the time it takes until the first article is carried out to the relay section can be reduced.

Note that, according to this configuration, it is possible to make the temporary placement region basically available for the purpose of temporarily placing the second article in the specific transfer mode by adopting a configuration in which an article carried into the relay section by the relay device (i.e., an article to be loaded into the article storage rack) is carried into the storage region. Furthermore, according to this configuration, the temporary placement region can be provided near the relay section to which the transport device travels every time when loading an article into the article storage rack or unloading an article from the article storage rack. Accordingly, when compared with a case where the second article is temporarily placed at a location that is far from the relay section in the storage section (for example, the storage location where the second article has been stored), it is easy to transport the temporarily placed second article to a desired storage location in the storage section with use of a travel operation of the transport device for loading an article into the article storage rack or unloading an article from the article storage rack. Therefore, the efficiency of transporting articles in the entire facility can be improved.

As described above, according to this configuration, in the case where the first article is arranged next to the second article on the rear side of the second article in the article storage rack, it is possible to reduce the time it takes until the first article is carried out to the relay section while improving the efficiency of transporting articles in the entire facility.

Further features and advantages of the article storage facility will be clarified by embodiments described below with reference to the drawings.

DESCRIPTION OF THE INVENTION

The following describes an embodiment of an article storage facility with reference to the drawings. Here, a case is described as an example in which an article storage facility according to the present disclosure is applied to an article storage facility in which a transport device travels along a travel path formed in correspondence with each stage of an article storage rack.

Figure 1:
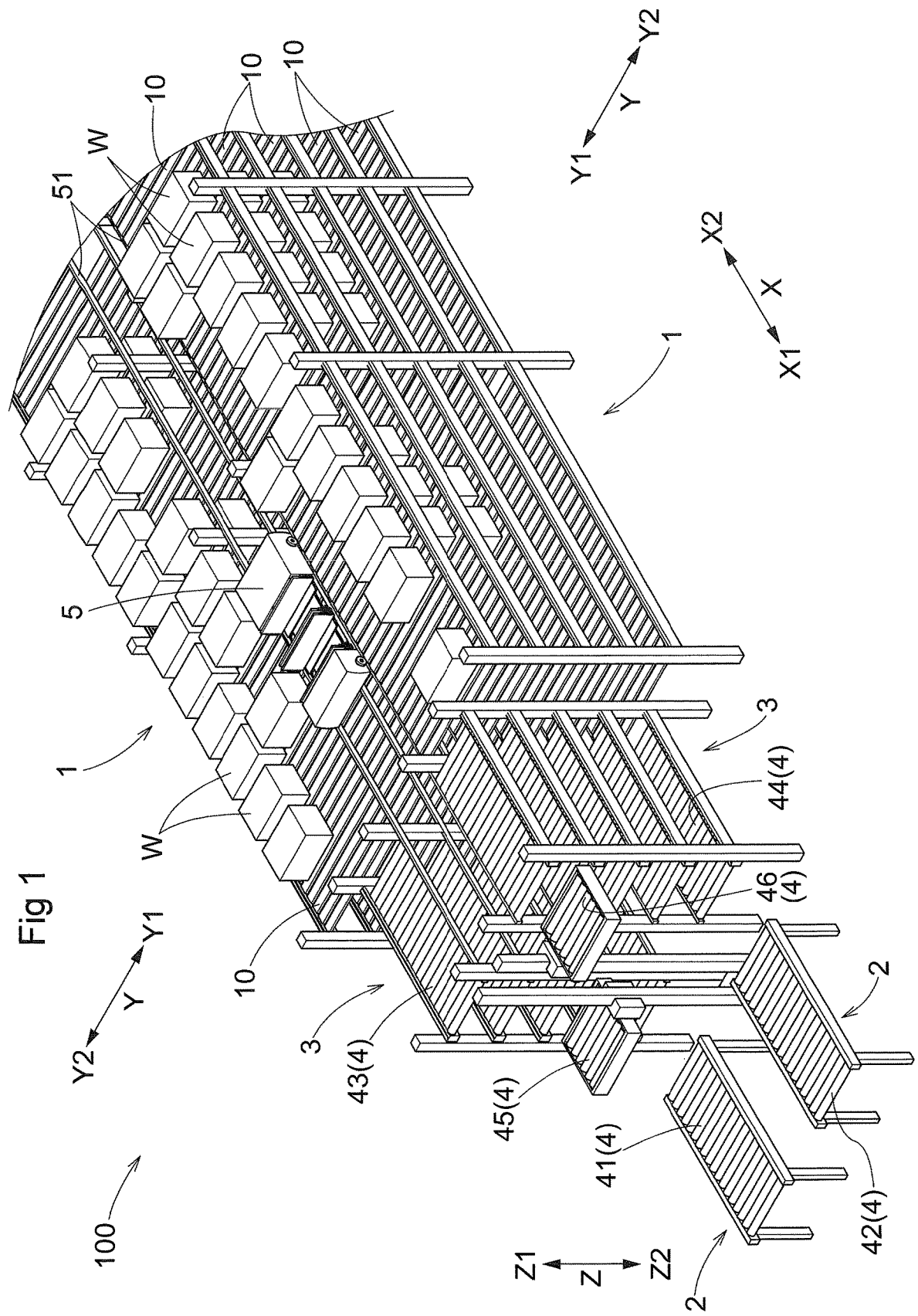
FIG. 1 is a perspective view of a portion of an article storage facility.
Figure 2:
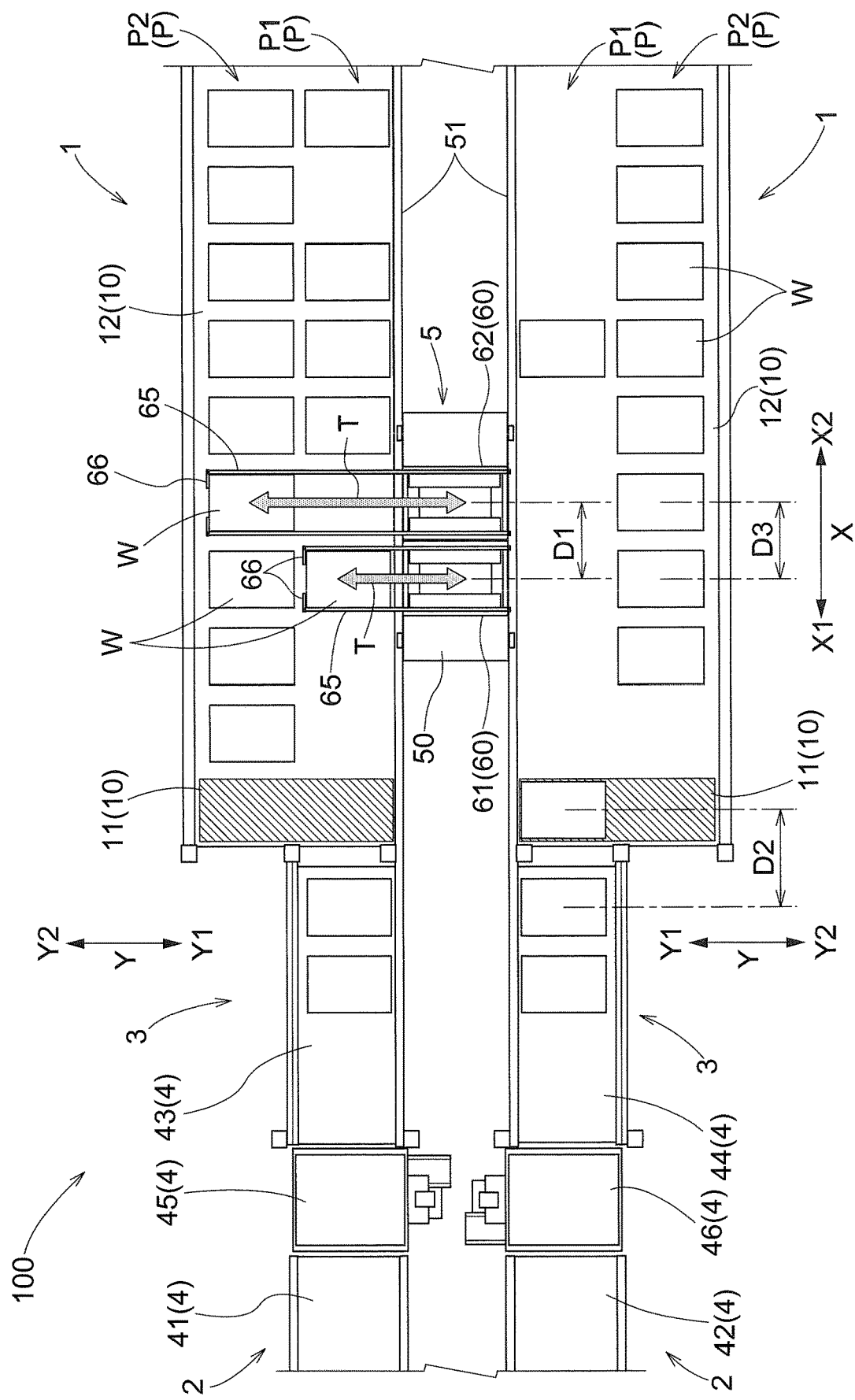
FIG. 2 is a plan view of a portion of the article storage facility.
Figure 3:
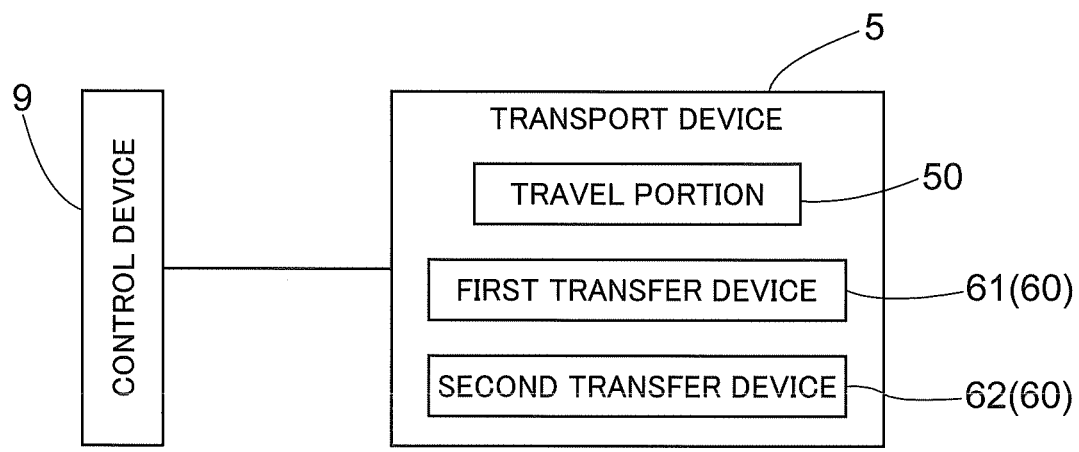
FIG. 3 is a control block diagram.

As shown in FIG. 1, an article storage facility 100 includes an article storage rack 1, a loading/unloading section 2, a relay device 4, a transport device 5, and a control device 9 (see FIG. 3). The article storage rack 1 includes a storage section 10 in which a plurality of articles W are storable next to each other in a depth direction Y. Positions in the depth direction Y at which the articles W are stored in the storage section 10 will be referred to as storage positions P as shown in FIG. 2. The storage section 10 supports the articles W from a lower side Z2 (the lower side in an up-down direction Z). Examples of the articles W include cardboard cases and container cases. The depth direction Y is orthogonal to a width direction X of the article storage rack 1. Here, the width direction X and the depth direction Y are both horizontal directions extending along a horizontal plane. In the present embodiment, a pair of article storage racks 1 are installed facing each other in the depth direction Y and sandwiching a travel path of the transport device 5. A configuration is also possible in which the article storage rack 1 is provided only on one side in the depth direction Y relative to the travel path of the transport device 5.

As shown in FIGS. 1 and 2, the storage section 10 in the present embodiment is configured to be capable of storing two articles W next to each other in the depth direction Y. That is, in the present embodiment, an article W is stored at either one of two storage positions P (specifically, a first storage position P1 and a second storage position P2) in the storage section 10. As shown in FIG. 2, out of the two storage positions P, a storage position P that is on a front side Y1 is the first storage position P1, and a storage position P that is on a rear side Y2 is the second storage position P2. Here, the front side Y1 is one side in the depth direction Y (specifically, the side from which articles W are placed into and taken out from the storage section 10), and the rear side Y2 is opposite to the front side Y1 in the depth direction Y.

As shown in FIG. 2, the storage section 10 is configured to be capable of storing a plurality of articles W next to each other in the width direction X. That is, the storage section 10 is configured to be capable of storing a plurality of articles W next to each other in the width direction X at each storage position P (here, each of the first storage position P1 and the second storage position P2). The storage section 10 in which a plurality of articles W are storable next to each other in the width direction X can be obtained by arranging a plurality of plate-like bodies in the width direction X, for example. Each plate-like body is formed into a rectangular shape in a plan view (as viewed in the up-down direction Z) or a U-shape that is open on the front side Y1 in a plan view, for example.

In the present embodiment, each article storage rack 1 includes storage sections 10 at a plurality of positions in the up-down direction Z (vertical direction), and is configured to be capable of storing articles W on each of a plurality of stages (shelves) arranged in the up-down direction Z. Note that a configuration is also possible in which each article storage rack 1 includes the storage section 10 only at a single position in the up-down direction Z.

The loading/unloading section 2 is outside the storage sections 10 in the width direction X. That is, the loading/unloading section 2 is outside the region in which the storage sections 10 are located in the width direction X. The loading/unloading section 2 is on a first side X1 in the width direction X relative to the storage sections 10. In other words, the storage sections 10 are on a second side X2 that is the other side in the width direction X (i.e., the side opposite to the first side X1 in the width direction X), relative to the loading/unloading section 2. Articles W are carried in and carried out through the loading/unloading section 2. Specifically, an article W that is to be loaded into the article storage rack 1 is carried into the loading/unloading section 2 from a loading line or the like, and an article W that is unloaded from the article storage rack 1 is carried out from the loading/unloading section 2 to an unloading line or the like. Note that articles W may be carried into or out from the loading/unloading section 2 by a transport vehicle, a worker, or the like.

As shown in FIGS. 1 and 2, in the present embodiment, a first conveyor 41 and a second conveyor 42 are provided in the loading/unloading section 2. In other words, the loading/unloading section 2 is provided on a transport path along which articles W are transported by the first conveyor 41 and a transport path along which articles W are transported by the second conveyor 42. The first conveyor 41 is a loading conveyor for loading articles W into the article storage rack 1, and transports articles W toward the second side X2 in the width direction in the loading/unloading section 2. The second conveyor 42 is an unloading conveyor for unloading articles W from the article storage rack 1, and transports articles W toward the first side X1 in the width direction in the loading/unloading section 2. The first conveyor 41 constitutes the loading line, for example, and the second conveyor 42 constitutes the unloading line, for example. Roller conveyors or belt conveyors can be used as the first conveyor 41 and the second conveyor 42, for example. Note that a configuration is also possible in which the first conveyor 41 and the second conveyor 42 can be used as either the loading conveyor or the unloading conveyor according to the state of the article storage facility 100 at that time.

As shown in FIGS. 1 and 2, there is a relay section 3 between the loading/unloading section 2 and each storage section 10 in the width direction X. Specifically, the relay section 3 is adjacent to the storage section 10 on the first side X1 in the width direction relative to the storage section 10. An article W to be loaded into the article storage rack 1 is transported from the loading/unloading section 2 via the relay section 3 to the storage section 10, and an article W to be unloaded from the article storage rack 1 is transported from the storage section 10 via the relay section 3 to the loading/unloading section 2.

In the present embodiment, a third conveyor 43 and a fourth conveyor 44 are provided in the relay section 3. In other words, the relay section 3 is provided on a transport path along which articles W are transported by the third conveyor 43 and a transport path along which articles W are transported by the fourth conveyor 44. The third conveyor 43 is a loading conveyor for loading articles W into the article storage rack 1, and transports articles W toward the second side X2 in the width direction in the relay section 3. The fourth conveyor 44 is an unloading conveyor for unloading articles W from the article storage rack 1, and transports articles W toward the first side X1 in the width direction in the relay section 3. Roller conveyors or belt conveyors can be used as the third conveyor 43 and the fourth conveyor 44, for example. Note that a configuration is also possible in which the third conveyor 43 and the fourth conveyor 44 can be used as either the loading conveyor or the unloading conveyor according to the state of the article storage facility 100 at that time.

As described above, the present embodiment includes the pair of article storage racks 1 facing each other in the depth direction Y and sandwiching the travel path of the transport device 5. The third conveyor 43 is next to the storage sections 10 of one of the article storage racks 1 on the first side X1 in the width direction X relative to the storage sections 10, and the fourth conveyor 44 is next to the storage sections 10 of the other article storage rack 1 on the first side X1 in the width direction X relative to the storage sections 10. The above-described first conveyor 41 is next to the third conveyor 43 on the first side X1 in the width direction X relative to the third conveyor 43, and the above-described second conveyor 42 is next to the fourth conveyor 44 on the first side X1 in the width direction X relative to the fourth conveyor 44.

As shown in FIG. 1, in the present embodiment, relay sections 3 are respectively provided at heights (positions in the up-down direction Z) at which the storage sections 10 are located. Specifically, the third conveyor 43 and the fourth conveyor 44 are provided at each height at which a storage section 10 is located. A first lift device 45 and a second lift device 46 are provided between the loading/unloading section 2 and the relay sections 3 in the width direction X. The first lift device 45 is sandwiched between the first conveyor 41 and the third conveyors 43 from both sides in the width direction X, and the second lift device 46 is sandwiched between the second conveyor 42 and the fourth conveyors 44 from both sides in the width direction X. The first lift device 45 and the second lift device 46 are configured to be movable upward and downward (i.e., movable in the up-down direction Z). In a state where the first lift device 45 is moved to the height corresponding to the first conveyor 41, an article W is transported between the first lift device 45 and the first conveyor 41, and in a state where the first lift device 45 is moved to a height corresponding to any of the third conveyors 43, an article W is transported between the first lift device 45 and the third conveyor 43. Also, in a state where the second lift device 46 is moved to the height corresponding to the second conveyor 42, an article W is transported between the second lift device 46 and the second conveyor 42, and in a state where the second lift device 46 is moved to a height corresponding to any of the fourth conveyors 44, an article W is transported between the second lift device 46 and the fourth conveyor 44.

The relay device 4 transports articles W between the loading/unloading section 2 and the relay sections 3. The relay device 4 transports an article W to be loaded into the article storage rack 1 from the loading/unloading section 2 to a relay section 3, and transports an article W unloaded from the article storage rack 1 from a relay section 3 to the loading/unloading section 2. In the present embodiment, the relay device 4 includes the first conveyor 41, the second conveyor 42, the third conveyors 43, the fourth conveyors 44, the first lift device 45, and the second lift device 46. An article W to be loaded into the article storage rack 1 is transported from the loading/unloading section 2 to a relay section 3 by the first conveyor 41, the first lift device 45, and a third conveyor 43 in this order. An article W unloaded from the article storage rack 1 is transported from a relay section 3 to the loading/unloading section 2 by a fourth conveyor 44, the second lift device 46, and the second conveyor 42 in this order.

As described above, the relay device 4 in the present embodiment is configured to transport an article W from the loading/unloading section 2 to a relay section 3 with use of a group of devices including the first conveyor 41 and the third conveyors 43 (in this example, the group of devices further includes the first lift device 45), and transport an article W from a relay section 3 to the loading/unloading section 2 with use of a group of devices including the second conveyor 42 and the fourth conveyors 44 (in this example, the group of devices further includes the second lift device 46). Note that the relay device 4 may also be configured to use a group of devices to transport an article W from the loading/unloading section 2 to a relay section 3 and transport an article W from a relay section 3 to the loading/unloading section 2. In this case, the relay device 4 may be configured to include only one of the two groups of devices described above.

The transport device 5 travels in the width direction X on the front side Y1 of the storage sections 10 and transports articles W between the storage sections 10 and the relay sections 3 (in the present embodiment, the third conveyors 43 and the fourth conveyors 44). That is, the transport device 5 performs a travel operation R of traveling in the width direction X and a transfer operation T of transferring an article W to a storage section 10 or a relay section 3. The transport device 5 transports an article W to be loaded into the article storage rack 1 from a relay section 3 (in the present embodiment, a third conveyor 43) to a storage section 10, and transports an article W to be unloaded from the article storage rack 1 from a storage section 10 to a relay section 3 (in the present embodiment, a fourth conveyor 44). As shown in FIG. 1, in the present embodiment, the same number of travel paths of the transport device 5 as the number of stages in each article storage rack 1 (in other words, the number of storage sections 10 arranged in the up-down direction Z) are formed in correspondence with the respective stages in the article storage rack 1. Specifically, as shown in FIGS. 1 and 2, each travel path of the transport device 5 is formed by a pair of rails 51 facing each other in the depth direction Y at the same position in the up-down direction Z. The transport device 5 is disposed on the travel path of each stage, and transports articles W between a storage section 10 and a relay section 3 in the same stage (in other words, between the storage section 10 and the relay section 3 located at the same position in the up-down direction Z). FIG. 1 shows only the uppermost transport device 5 on an upper side Z1 (the upper side in the up-down direction Z).

As shown in FIG. 2, each transport device 5 includes a plurality of transfer devices 60 that are next to each other in the width direction X and capable of transferring articles W to the storage section 10 and the relay section 3. The transport device 5 performs the transfer operation T of transferring articles W, with use of the transfer devices 60. The transport device 5 includes a travel portion 50 configured to travel in the width direction X, and the transfer devices 60 are supported by the travel portion 50. As described above, the present embodiment includes the pair of article storage racks 1 facing each other in the depth direction Y and sandwiching the travel path of the transport device 5, and the transport device 5 is configured to be capable of transferring articles W to the storage sections 10 of both of the pair of article storage racks 1 with use of the transfer devices 60.

Here, one of the plurality of transfer devices 60 will be referred to as a "first transfer device 61", and another transfer device 60 will be referred to as a "second transfer device 62". In the present embodiment, the first transfer device 61 is on the first side X1 in the width direction relative to the second transfer device 62. Specifically, the first transfer device 61 is a transfer device 60 that is adjacent to the second transfer device 62 on the first side X1 in the width direction relative to the second transfer device 62. In the present embodiment, each transport device 5 includes two transfer devices 60. That is, the first transfer device 61 and the second transfer device 62 are the two transfer devices 60 included in each transport device 5. As described above, in the present embodiment, the number of articles W that can be stored next to each other in the depth direction Y in each storage section 10 and the number of transfer devices 60 included in each transport device 5 are the same (specifically, two).

Each transfer device 60 is configured to transfer an article W by moving the article W in the depth direction Y. Specifically, each transfer device 60 transfers an article W from a transfer target position such as the storage section 10 or the relay section 3 to the transport device 5 by moving the article W toward the front side Y1, and transfers an article W from the transport device 5 to a transfer target position by moving the article W toward the rear side Y2. The article W transferred from the transfer target position to the transport device 5 is held by the transport device 5 by being supported by a support portion included in the transport device 5 (e.g., a support portion included in the transfer device 60 or a support portion included the travel portion 50). FIG. 2 shows a situation in which the first transfer device 61 performs a transfer operation T of transferring an article W between the first storage position P1 in the storage section 10 and the transport device 5, and the second transfer device 62 performs a transfer operation T of transferring an article W between the second storage position P2 in the storage section 10 and the transport device 5. As described above, the transfer devices 60 are configured to be capable of transferring an article W to any storage position P (in the present embodiment, both of the first storage position P1 and the second storage position P2) in the storage section 10. Also, the first transfer device 61 and the second transfer device 62 are provided in the transport device 5 in such a manner that two articles W next to each other in the width direction X (here, two articles W next to each other in the width direction X with no other article W interposed therebetween) in the storage section 10 or the relay section 3 can be transferred between transfer target positions and the transport device 5 simultaneously or in parallel with each other with use of the two transfer devices 60.

As shown in FIG. 2, in the present embodiment, each transfer device 60 is configured to move an article W in the depth direction Y by protruding or retracting an abutting portion 66 configured to abut against the article W, in the depth direction Y (protruding the abutting portion 66 toward the rear side Y2 or retracting the abutting portion 66 toward the front side Y1) with use of a protruding/retracting mechanism 65 (e.g., a slide mechanism) Specifically, the transfer device 60 transfers an article W from the transport device 5 to a transfer target position by protruding the abutting portion 66 toward the rear side Y2 to push the article W toward the rear side Y2 with use of the abutting portion 66. Also, the transfer device 60 transfers an article W from a transfer target position to the transport device 5 by retracting the abutting portion 66 toward the front side Y1 to pull the article W toward the front side Y1 with use of the abutting portion 66. In FIG. 2, the abutting portion 66 used to push an article W toward the rear side Y2 is omitted to simplify the drawing. Note that the configuration of the transfer device 60 is not limited to this configuration. For example, it is also possible to use, as the transfer device 60, a fork-type transfer device configured to protrude and retract a support, which supports an article W from the lower side Z2, in the depth direction Y or a clamp-type transfer device configured to protrude and retract a clamp portion holding an article W in the depth direction Y.

The control device 9 controls operations of the transport device 5. The control device 9 includes an arithmetic processing device such as a CPU and a peripheral circuit such as a memory. Each function of the control device 9 is implemented through cooperation of these pieces of hardware and a program that is executed by hardware such as the arithmetic processing device. The control device 9 controls operations of the transport device 5 by controlling driving of various motors based on detection information obtained from various sensors, for example. The control device 9 controls operations of the travel portion 50 in such a manner that the travel portion 50 performs the travel operation R, and controls operations of the transfer devices 60 (in the present embodiment, operations of the first transfer device 61 and the second transfer device 62) in such a manner that the transfer devices 60 perform the transfer operation T. Technical features of the control device 9 disclosed in the present specification are also applicable to a method for controlling the transport device 5, and the method for controlling the transport device 5 is also disclosed in the present specification. This control method includes performing each processing (each step) shown in FIG. 4.

In the present embodiment, the control device 9 performs unloading control to unload an article W from the article storage rack 1 and loading control to load an article W into the article storage rack 1 based on instructions from an upper-level control device. When performing the unloading control, the control device 9 causes the transport device 5 to perform: a travel operation R of traveling to a position corresponding to a storage location of an article W in the storage section 10 (specifically, a position at which a transfer device 60 faces the article W in the depth direction Y); a transfer operation T of transferring the article W from the storage section 10 to the transport device 5 with use of the transfer device 60; a travel operation R of traveling to a position corresponding to the relay section 3 (specifically, a position at which the transfer device 60 faces a transfer location of the article W in the relay section 3, in the depth direction Y) while holding the article W; and a transfer operation T of transferring the article W from the transport device 5 to the relay section 3 with use of the transfer device 60, in this order.

When performing the loading control, the control device 9 causes the transport device 5 to perform: a travel operation R of traveling to a position corresponding to the relay section 3 (specifically, a position at which a transfer device 60 faces an article W placed in the relay section 3, in the depth direction Y); a transfer operation T of transferring the article W from the relay section 3 to the transport device 5 with use of the transfer device 60; a travel operation R of traveling to a position corresponding to the storage section 10 (specifically, a position at which the transfer device 60 faces a storage location of the article W in the storage section 10, in the depth direction Y) while holding the article W; and a transfer operation T of transferring the article W from the transport device 5 to the storage section 10 with use of the transfer device 60, in this order.

As shown in FIG. 2, in each storage section 10, a region on the first side X1 in the width direction is a temporary placement region 11, and a region on the side opposite to the first side X1 in the width direction X (i.e., on the second side X2 in the width direction) relative to the temporary placement region 11 is a storage region 12. In other words, the control device 9 manages the temporary placement region 11 and the storage region 12 of each storage section 10 separately from each other. The control device 9 is configured to transfer an article W to be loaded (specifically, an article W carried into the relay section 3 by the relay device 4) to the storage region 12 when performing the loading control. The temporary placement region 11 is set to be smaller than the storage region 12 in the width direction X. In the present embodiment, the size of the temporary placement region 11 in the width direction X corresponds to the size of each article W in the width direction X (that is, a plurality of articles W cannot be arranged next to each other in the width direction X in the temporary placement region 11). Other than this configuration, a configuration is also possible in which the size of the temporary placement region 11 in the width direction X is set in such a manner that a plurality of articles W (for example, two articles VV) can be arranged next to each other in the width direction X in the temporary placement region 11.

Figure 5:
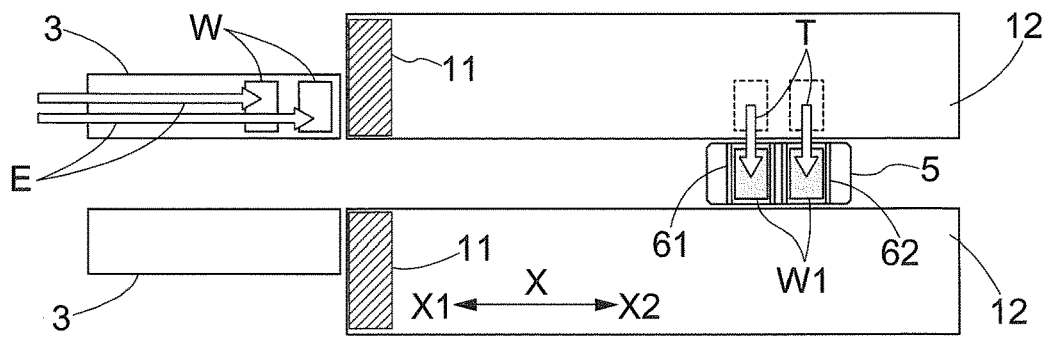
FIG. 5 is a diagram showing a situation of unloading control.
Figure 6:
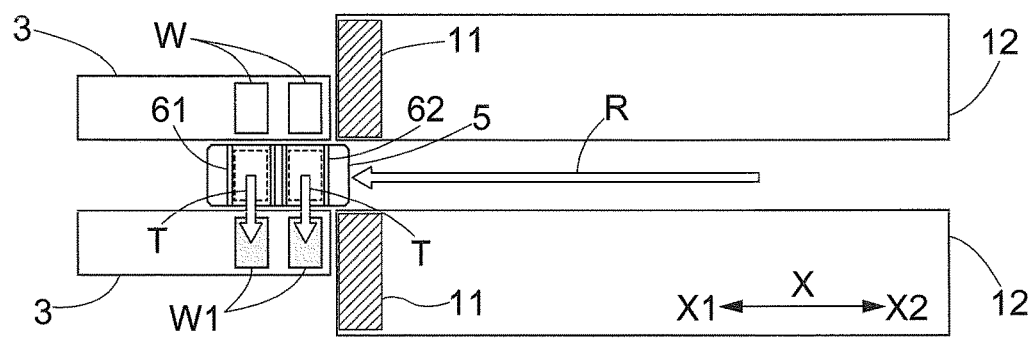
FIG. 6 is a diagram showing a situation of the unloading control.
Figure 7:
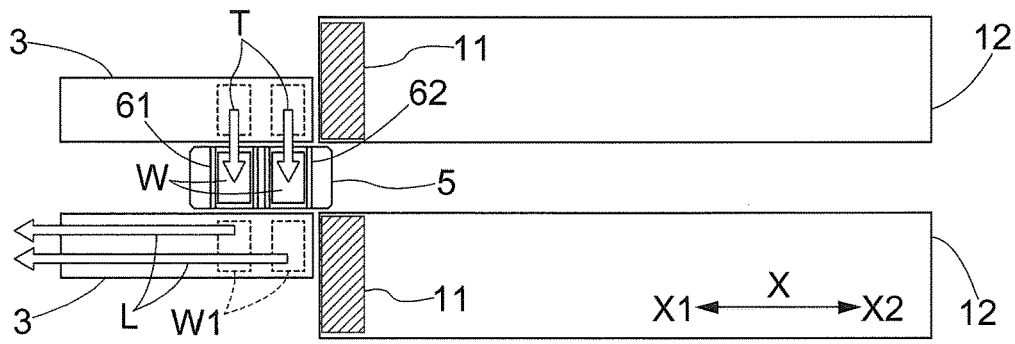
FIG. 7 is a diagram showing a situation of loading control.
Figure 8:
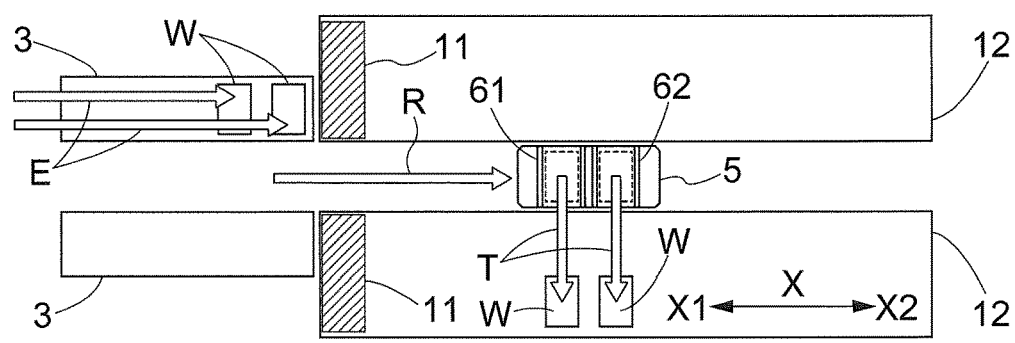
FIG. 8 is a diagram showing a situation of the loading control.

In the following description, an article W that is to be unloaded from the article storage rack 1 will be referred to as a "first article W1", and an article W that is not to be unloaded from the article storage rack 1 will be referred to as a "second article W2". FIGS. 5 to 8 show, in a chronological order, an example of situations in which the control device 9 executes unloading control to unload two first articles W1 from the article storage rack 1 and thereafter executes loading control to load two articles W into the article storage rack 1. FIG. 6 shows a situation at a point in time later than that shown in FIG. 5, FIG. 7 shows a situation at a point in time later than that shown in FIG. 6, and FIG. 8 shows a situation at a point in time later than that shown in FIG. 7.

As shown in FIG. 5, the transport device 5 performs a transfer operation T of transferring two first articles W1 from the storage region 12 to the transport device 5 with use of the first transfer device 61 and the second transfer device 62 after performing a travel operation R of traveling to a position corresponding to storage locations of the two first articles W1 in the storage region 12. In the example shown in FIG. 5, the relay device 4 is performing a carry-in operation E of carrying two articles W that are to be loaded, into the relay section 3 at this point in time. As shown in FIG. 6, the transport device 5 then performs a travel operation R of traveling to a position corresponding to the relay section 3 while holding the two first articles W1, and thereafter performs a transfer operation T of transferring the two first articles W1 from the transport device 5 to the relay section 3 with use of the first transfer device 61 and the second transfer device 62.

As shown in FIG. 7, the transport device 5 performs a transfer operation T of transferring the two articles W placed in the relay section 3 from the relay section 3 to the transport device 5 with use of the first transfer device 61 and the second transfer device 62. In the example shown in FIG. 7, the relay device 4 is performing a carry-out operation L of carrying out the two first articles W1 from the relay section 3 at this point in time. As shown in FIG. 8, the transport device 5 then performs a travel operation R of traveling to a position corresponding to the storage region 12 while holding the two articles W, and thereafter performs a transfer operation T of transferring the two articles W from the transport device 5 to the storage region 12 with use of the first transfer device 61 and the second transfer device 62. In the example shown in FIG. 8, the relay device 4 is performing a carry-in operation E of carrying two articles W that are to be loaded, into the relay section 3 at this point in time.

Incidentally, there is a case where the first article W1 that is to be unloaded is arranged next to the second article W2 that is not to be unloaded, on the rear side Y2 of the second article W2 (specifically, next to the second article W2 on the rear side Y2 thereof with no other article W interposed between the first article W1 and the second article W2) in the storage region 12. In the present embodiment, in a case where the first article W1 is stored at the second storage position P2 and the second article W2 is stored at the first storage position P1 at the same position in the width direction X, the first article W1 is next to the second article W2 on the rear side Y2 of the second article W2. The control device 9 is configured to be capable of switching a control mode of the transport device 5 to a specific transfer mode in the case where the first article W1 is arranged next to the second article W2 on the rear side Y2 of the second article W2 in the storage region 12.

In the specific transfer mode, the transport device 5 is caused to execute a first transfer operation T1, a specific travel operation R0, and a second transfer operation T2 in this order. In the present embodiment, the specific travel operation R0 corresponds to a "travel operation". Note that executing a plurality of target operations (here, the three operations described above) in a stated order means executing the plurality of target operations in the order determined in advance (here, the order of the first transfer operation T1, the specific travel operation R0, and the second transfer operation T2) even if an operation (for example, a travel operation R that is necessary to perform the next target operation) other than the plurality of target operations is executed between the target operations. Note that the travel operation R of the transport device 5 is performed at any time as necessary.

The first transfer operation T1 is an operation of transferring the second article W2 from the storage region 12 to the transport device 5 with use of the second transfer device 62, and thereafter transferring the first article W1 from the storage region 12 to the transport device 5 with use of the first transfer device 61. The specific travel operation R0 is an operation of traveling to a boundary corresponding position B while holding the first article W1 and the second article W2. Here, the boundary corresponding position B is a position corresponding to a boundary between the relay section 3 and the temporary placement region 11. In other words, the boundary corresponding position B is set based on the boundary between the relay section 3 and the temporary placement region 11. In an example of specific transfer control described below with reference to FIGS. 9 to 12, the position of the transport device 5 shown in FIG. 11 is the boundary corresponding position B. In another example of specific transfer control described below with reference to FIGS. 13 to 16, the position of the transport device 5 shown in FIG. 14 is the boundary corresponding position B. The second transfer operation T2 is an operation of transferring the first article W1 from the transport device 5 to the relay section 3 with use of the first transfer device 61, and transferring the second article W2 from the transport device 5 to the temporary placement region 11 with use of the second transfer device 62.

Figure 4:
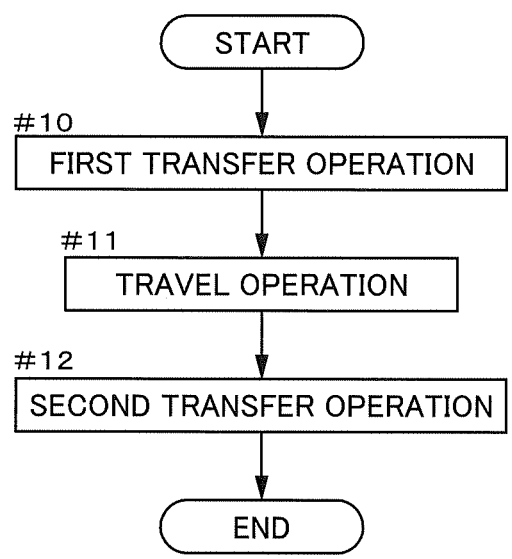
FIG. 4 is a flowchart showing a processing procedure of specific transfer control.

Upon switching the control mode of the transport device 5 to the specific transfer mode, the control device 9 performs specific transfer control to operate the transport device 5 based on the specific transfer mode. That is, a method for controlling the article storage facility 100 includes: a mode switching step of switching the control mode of the transport device 5 to the specific transfer mode; and a specific transfer control step of operating the transport device 5 based on the specific transfer mode (a step of executing the specific transfer control). As shown in FIG. 4, in the specific transfer control, operations of the transport device 5 are controlled in such a manner that the transport device 5 executes the first transfer operation T1 (step #10), the specific travel operation R0 as a travel operation (step #11), and the second transfer operation T2 (step #12) in this order.

Figure 9:
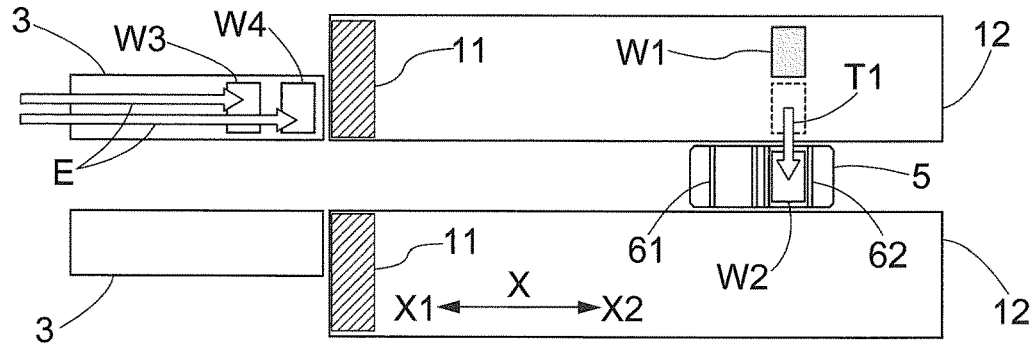
FIG. 9 is a diagram showing a situation of specific transfer control.
Figure 10:
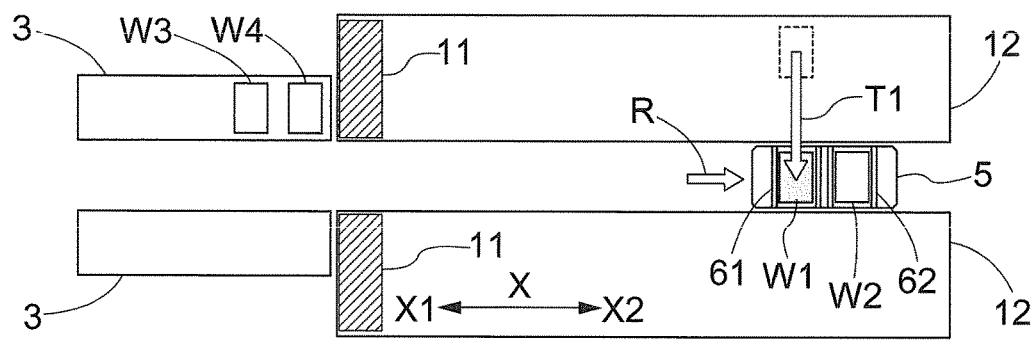
FIG. 10 is a diagram showing a situation of the specific transfer control.
Figure 11:
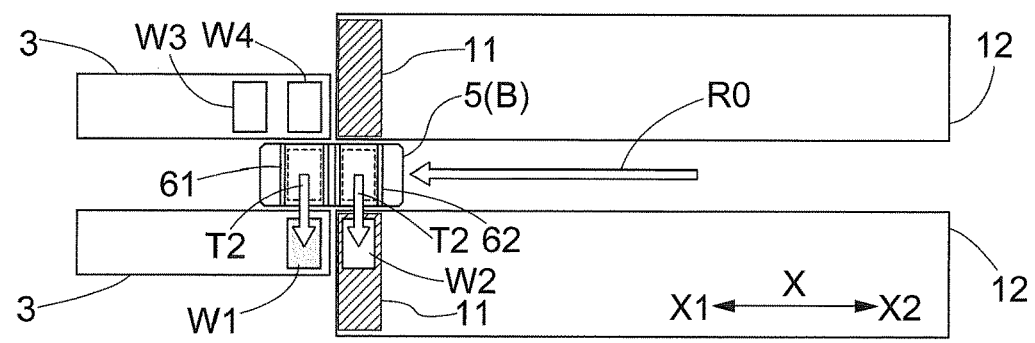
FIG. 11 is a diagram showing a situation of the specific transfer control.
Figure 12:
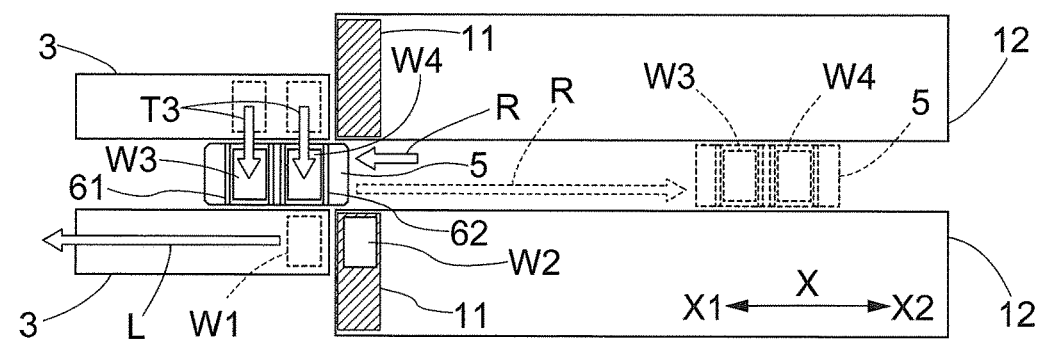
FIG. 12 is a diagram showing a situation of the specific transfer control.

FIGS. 9 to 12 show an example of situations in which the control device 9 executes the specific transfer control, in a chronological order. FIG. 10 shows a situation at a point in time later than that shown in FIG. 9, FIG. 11 shows a situation at a point in time later than that shown in FIG. 10, and FIG. 12 shows a situation at a point in time later than that shown in FIG. 11.

As shown in FIG. 9, the transport device 5 performs the first transfer operation T1 after performing a travel operation R of traveling to a position corresponding to storage locations of the first article W1 and the second article W2 (specifically, a position at which the second transfer device 62 faces the second article W2 in the depth direction Y) in the storage region 12. In this example, the relay device 4 is performing a carry-in operation E of carrying a third article W3 and a fourth article W4 that are two articles W to be loaded, into the relay section 3 at this point in time. In the first transfer operation T1, the second article W2 is transferred from the storage region 12 to the transport device 5 with use of the second transfer device 62 (see FIG. 9), then a travel operation R of traveling to a position at which the first transfer device 61 faces the first article W1 in the depth direction Y (here, a travel operation R toward the second side X2 in the width direction) is performed while the second article W2 is held, and the first article W1 is transferred from the storage region 12 to the transport device 5 with use of the first transfer device 61 (see FIG. 10). As described above, in the first transfer operation T1, the travel operation R of traveling while holding the second article W2 is performed between the transfer operation T of transferring the second article W2 from the storage region 12 to the transport device 5 with use of the second transfer device 62 and the transfer operation T of transferring the first article W1 from the storage region 12 to the transport device 5 with use of the first transfer device 61.

As shown in FIG. 11, the transport device 5 performs the specific travel operation R0. The boundary corresponding position B in the specific travel operation R0 is any of; a position at which the first transfer device 61 faces a transfer location of the first article W1 in the relay section 3 in the depth direction Y; a position at which the second transfer device 62 faces a transfer location of the second article W2 in the temporary placement region 11 in the depth direction Y; and a position at which the first transfer device 61 faces the transfer location of the first article W1 in the relay section 3 in the depth direction Y and the second transfer device 62 faces the transfer location of the second article W2 in the temporary placement region 11 in the depth direction Y. In this example, the boundary corresponding position B in the specific travel operation R0 is the position at which the first transfer device 61 faces the transfer location of the first article W1 in the relay section 3 in the depth direction Y and the second transfer device 62 faces the transfer location of the second article W2 in the temporary placement region 11 in the depth direction Y as shown in FIG. 11.

As shown in FIG. 11, the transport device 5 performs the second transfer operation T2 after performing the specific travel operation R0. In the example of the second transfer operation T2 shown in FIG. 11, a transfer operation T of transferring the second article W2 from the transport device 5 to the temporary placement region 11 with use of the second transfer device 62 is performed in parallel with a transfer operation T of transferring the first article W1 from the transport device 5 to the relay section 3 with use of the first transfer device 61. Note that executing two operations in parallel with each other means executing the two operations in such a manner that an operation period of one of the operations overlaps at least partially with an operation period of the other operation. As shown in FIG. 12, the relay device 4 performs a carry-out operation L of carrying the first article W1 transferred from the transport device 5 to the relay section 3, out of the relay section 3. Note that the transfer location to which the second article W2 is transferred in the second transfer operation T2 may be either the first storage position P1 or the second storage position P2 in the temporary placement region 11, but the second storage position P2 is selected as the transfer location of the second article W2 when there is no other article W at the first storage position P1 that is on the front side Y1 of the second storage position P2.

In this example, after performing the second transfer operation T2, the transport device 5 performs a travel operation R (a travel operation R indicated by a solid line arrow shown in FIG. 12) of traveling to a position corresponding to the relay section 3 as shown in FIG. 12. In the example shown in FIG. 12, the third article W3 is located on the first side X1 in the width direction relative to the fourth article W4, and the position corresponding to the relay section 3 in the travel operation R described above is a position at which the first transfer device 61 faces the third article W3 placed in the relay section 3 in the depth direction Y, and the second transfer device 62 faces the fourth article W4 placed in the relay section 3 in the depth direction Y. Then, the transport device 5 performs a third transfer operation T3. The third transfer operation T3 is an operation of transferring the third article W3 from the relay section 3 to the transport device 5 with use of the first transfer device 61, and transferring the fourth article W4 from the relay section 3 to the transport device 5 with use of the second transfer device 62. Here, in the third transfer operation T3, the transfer operation T of transferring the fourth article W4 from the relay section 3 to the transport device 5 with use of the second transfer device 62 is performed in parallel with the transfer operation T of transferring the third article W3 from the relay section 3 to the transport device 5 with use of the first transfer device 61.

As shown in FIG. 12, after performing the third transfer operation T3, the transport device 5 performs a travel operation R (a travel operation R indicated by a broken line arrow shown in FIG. 12) of traveling to a position corresponding to the storage region 12 while holding the third article W3 and the fourth article W4. The position corresponding to the storage region 12 in this travel operation R is any of: a position at which the first transfer device 61 faces a storage location of the third article W3 in the storage region 12 in the depth direction Y; a position at which the second transfer device 62 faces a storage location of the fourth article W4 in the storage region 12 in the depth direction Y; and a position at which the first transfer device 61 faces the storage location of the third article W3 in the storage region 12 in the depth direction Y and the second transfer device 62 faces the storage location of the fourth article W4 in the storage region 12 in the depth direction Y. After performing the travel operation R described above, the transport device 5 performs a transfer operation T of transferring the third article W3 from the transport device 5 to the storage region 12 with use of the first transfer device 61 and a transfer operation T of transferring the fourth article W4 from the transport device 5 to the storage region 12 with use of the second transfer device 62, although these operations are not illustrated.

Here, as shown in FIG. 2, a distance in the width direction X between the first transfer device 61 and the second transfer device 62 (specifically, a distance in the width direction X between the center of the first transfer device 61 in the width direction X and the center of the second transfer device 62 in the width direction X) will be referred to as a "first distance D1". Also, a distance in the width direction X between a transfer location of an article W (specifically, the first article W1) in the relay section 3 and a transfer location of an article W (specifically, the second article W2) in the temporary placement region 11 (specifically, a distance in the width direction X between the center of the former transfer location in the width direction X and the center of the latter transfer location in the width direction X) will be referred to as a "second distance D2". Also, a distance in the width direction X between two articles W that are next to each other in the width direction X (here, two articles W next to each other in the width direction X with no other article W interposed therebetween) in the storage region 12 (specifically, a distance in the width direction X between the center of one of the articles W in the width direction X and the center of the other article W in the width direction X) will be referred to as a "third distance D3".

As described above, in the example of specific transfer control shown in FIGS. 9 to 12, the boundary corresponding position B is the position at which the first transfer device 61 faces the transfer location of the first article W1 in the relay section 3 in the depth direction Y, and the second transfer device 62 faces the transfer location of the second article W2 in the temporary placement region 11 in the depth direction Y. That is, the position of the transport device 5 for transferring the first article W1 to the relay section 3 (in other words, the position at which the transport device 5 can transfer the first article W1 to the relay section 3) and the position of the transport device 5 for transferring the second article W2 to the temporary placement region 11 (in other words, the position at which the transport device 5 can transfer the second article W2 to the temporary placement region 11) both correspond to the boundary corresponding position B. In the following description, the position of the transport device 5 for transferring the first article W1 to the relay section 3 will be referred to as a "first position", and the position of the transport device 5 for transferring the second article W2 to the temporary placement region 11 will be referred to as a "second position".

For example, in a configuration in which the first distance D1 is fixed, it is possible to set the first position and the second position to be the common position (boundary corresponding position B) as described above by setting the first distance D1 according to the second distance D2. Here, the first distance D1 being set according to the second distance D2 includes both a case where the first distance D1 is equal to the second distance D2 and a case where the first distance D1 differs from the second distance D2 within a range in which the first position and the second position can be set to be the common position. In a case where the first distance D1 is set according to the third distance D3 in the configuration in which the first distance D1 is fixed as described above, articles W can be transferred between the transport device 5 and the storage region 12 in parallel with each other by the first transfer device 61 and the second transfer device 62, respectively, as in the examples shown in FIGS. 5 and 8. That is, it is possible to transfer the two articles W to the storage region 12 simultaneously or in parallel with each other with use of the first transfer device 61 and the second transfer device 62. Here, the first distance D1 being set according to the third distance D3 includes both a case where the first distance D1 is equal to the third distance D3 and a case where the first distance D1 differs from the third distance D3 within a range in which two articles W can be transferred to the storage region 12 simultaneously or in parallel with each other as described above.

It is also possible to set the first position and the second position to be the common position (boundary corresponding position B) as described above by adopting a configuration in which the first distance D1 is changeable and a distance corresponding to the second distance D2 is included in the changeable range of the first distance D1, for example. In this case, the control device 9 controls the first distance D1 to be the distance corresponding to the second distance D2 when performing the second transfer operation T2. Here, the distance corresponding to the second distance D2 includes both a distance that is equal to the second distance D2 and a distance that differs from the second distance D2 within a range in which the first position and the second position can be set to be the common position. The first distance D1 can be made changeable by supporting the first transfer device 61 and/or the second transfer device 62 with the travel portion 50 in such a manner as to be movable in the width direction X, for example. In a case where the changeable range of the first distance D1 further includes a distance corresponding to the third distance D3 in the configuration in which the changeable range of the first distance D1 includes a distance corresponding to the second distance D2 as described above, it is possible to transfer two articles W to the storage region 12 simultaneously or in parallel with each other with use of the first transfer device 61 and the second transfer device 62 as in the examples shown in FIGS. 5 and 8. In this case, the control device 9 controls the first distance D1 to be the distance corresponding to the third distance D3 when transferring two articles W to the storage region 12 simultaneously or in parallel with each other with use of the first transfer device 61 and the second transfer device 62. Here, the distance corresponding to the third distance D3 includes both a distance that is equal to the third distance D3 and a distance that differs from the third distance D3 within a range in which two articles W can be transferred to the storage region 12 simultaneously or in parallel with each other as described above.

Figure 14:
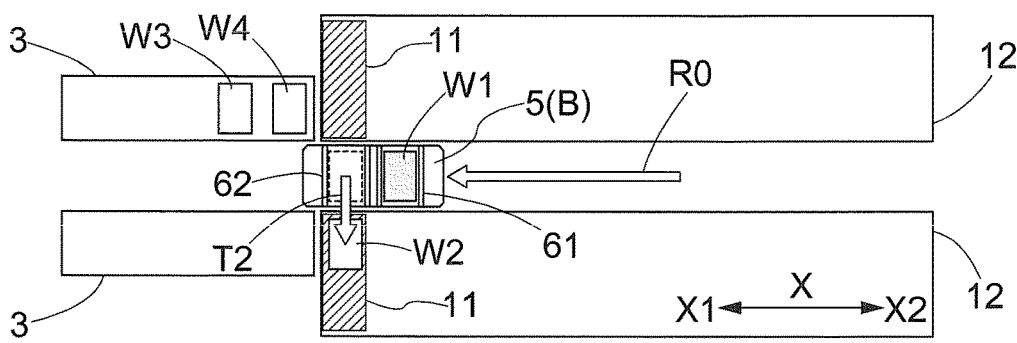
FIG. 14 is a diagram showing a situation of the specific transfer control according to the other embodiment.
Figure 15:
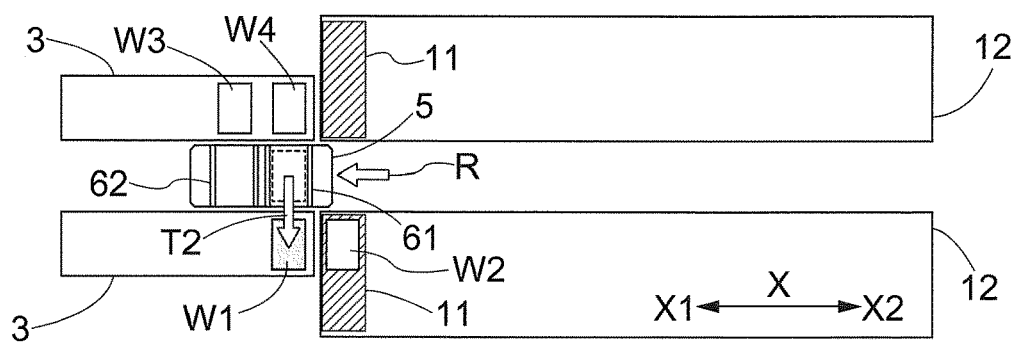
FIG. 15 is a diagram showing a situation of the specific transfer control according to the other embodiment.

Note that in a case where the first position and the second position cannot be set to be the common position (boundary corresponding position B), a travel operation R is performed (see FIG. 15) in the second transfer operation T2 between the transfer operation T of transferring the first article W1 from the transport device 5 to the relay section 3 with use of the first transfer device 61 and the transfer operation T of transferring the second article W2 from the transport device 5 to the temporary placement region 11 with use of the second transfer device 62, either one of the transfer operations T being performed earlier than the other, as in the example of specific transfer control described below (see FIGS. 14 and 15).

Incidentally, in the present embodiment, the control device 9 is configured to switch the control mode of the transport device 5 to the specific transfer mode under the condition that the transfer location of the second article W2 can be secured in the temporary placement region 11 when the first article W1 is arranged next to the second article W2 on the rear side Y2 of the second article W2 in the storage region 12. The control device 9 is configured to switch the control mode of the transport device 5 to a mode other than the specific transfer mode when the transfer location of the second article W2 cannot be secured in the temporary placement region 11. An example of the mode other than the specific transfer mode is a mode in which the transport device 5 is controlled to transfer the second article W2 to a vacant location in the storage region 12, and thereafter travel to a position corresponding to the relay section 3 while holding the first article W1, and transfer the first article W1 to the relay section 3.

OTHER EMBODIMENTS

Next, other embodiments of the article storage facility will be described.

(1) In the above embodiment, a configuration is described as an example in which the first transfer device 61 is on the first side X1 in the width direction relative to the second transfer device 62. However, the present disclosure is not limited to this configuration, and a configuration is also possible in which the first transfer device 61 is on the second side X2 in the width direction relative to the second transfer device 62. In this case, the transport device 5 performs a travel operation R in the second transfer operation T2 between the transfer operation T of transferring the first article W1 from the transport device 5 to the relay section 3 with use of the first transfer device 61 and the transfer operation T of transferring the second article W2 from the transport device 5 to the temporary placement region 11 with use of the second transfer device 62, either one of the transfer operations T being performed earlier than the other.

Figure 13:
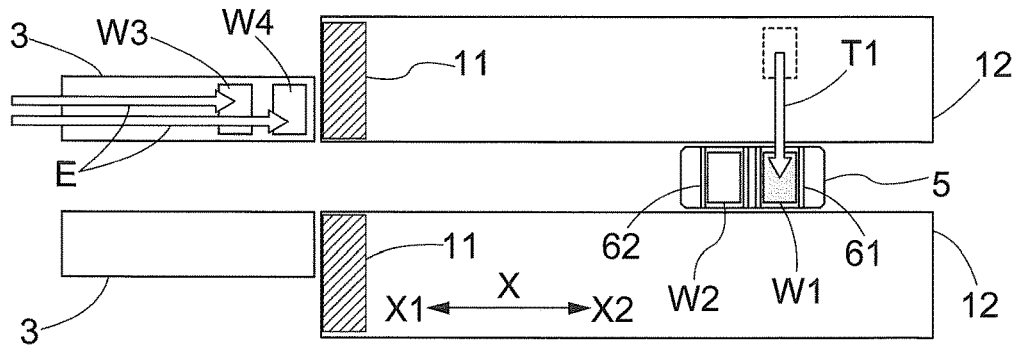
FIG. 13 is a diagram showing a situation of specific transfer control according to another embodiment.
Figure 16:
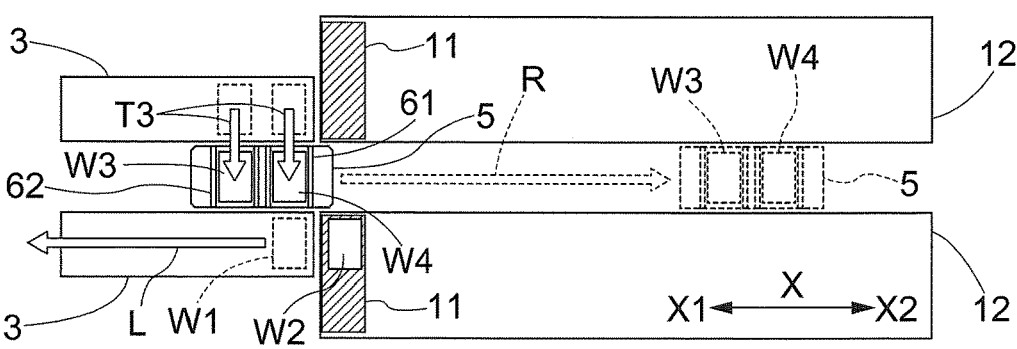
FIG. 16 is a diagram showing a situation of the specific transfer control according to the other embodiment.

FIGS. 13 to 16 show an example of situations in which the control device 9 executes the specific transfer control in the case where the first transfer device 61 is on the second side X2 in the width direction relative to the second transfer device 62, in a chronological order. FIG. 14 shows a situation at a point in time later than that shown in FIG. 13, FIG. 15 shows a situation at a point in time later than that shown in FIG. 14, and FIG. 16 shows a situation at a point in time later than that shown in FIG. 15.

In the first transfer operation T1 of the case where the first transfer device 61 is on the second side X2 in the width direction relative to the second transfer device 62, a travel operation R, which is performed while holding the second article W2, is performed in the same manner as in the above embodiment between the transfer operation T of transferring the second article W2 from the storage region 12 to the transport device 5 with use of the second transfer device 62 and the transfer operation T of transferring the first article W1 from the storage region 12 to the transport device 5 with use of the first transfer device 61, except that the travel operation R is performed toward the first side X1 in the width direction, not the second side X2 in the width direction. FIG. 13 shows a situation at a point in time when the first transfer operation T1 is complete, similarly to FIG. 10. In the example shown in FIG. 13, a carry-in operation E of carrying the third article W3 and the fourth article W4 into the relay section 3 is performed by the relay device 4 in parallel with the first transfer operation T1.

As shown in FIG. 14, the transport device 5 performs the specific travel operation R0. In this example, the boundary corresponding position B in the specific travel operation R0 is a position at which the second transfer device 62 faces the transfer location of the second article W2 in the temporary placement region 11 in the depth direction Y. Accordingly, in the second transfer operation T2, the transport device 5 transfers the second article W2 from the transport device 5 to the temporary placement region 11 with use of the second transfer device 62 (see FIG. 14), thereafter performs a travel operation R of traveling to a position at which the first transfer device 61 faces the transfer location of the first article W1 in the relay section 3 in the depth direction Y while holding the first article W1, and transfers the first article W1 from the transport device 5 to the relay section 3 with use of the first transfer device 61 (see FIG. 15). As shown in FIG. 16, the relay device 4 performs a carry-out operation L of carrying the first article W1 transferred from the transport device 5 to the relay section 3, out of the relay section 3.

As shown in FIG. 16, the transport device 5 performs the third transfer operation T3 after performing the second transfer operation T2. In this example, the third transfer operation T3 is an operation of transferring the fourth article W4 from the relay section 3 to the transport device 5 with use of the first transfer device 61 and transferring the third article W3 from the relay section 3 to the transport device 5 with use of the second transfer device 62. Here, in the third transfer operation T3, the transfer operation T of transferring the third article W3 from the relay section 3 to the transport device 5 with use of the second transfer device 62 is performed in parallel with the transfer operation T of transferring the fourth article W4 from the relay section 3 to the transport device 5 with use of the first transfer device 61.

As shown in FIG. 16, after performing the third transfer operation T3, the transport device 5 performs a travel operation R (a travel operation R indicated by a broken line arrow shown in FIG. 16) of traveling to a position corresponding to the storage region 12 while holding the third article W3 and the fourth article W4. The position corresponding to the storage region 12 in this travel operation R is any of: a position at which the first transfer device 61 faces a storage location of the fourth article W4 in the storage region 12 in the depth direction Y; a position at which the second transfer device 62 faces a storage location of the third article W3 in the storage region 12 in the depth direction Y; and a position at which the first transfer device 61 faces the storage location of the fourth article W4 in the storage region 12 in the depth direction Y and the second transfer device 62 faces the storage location of the third article W3 in the storage region 12 in the depth direction Y. After performing the travel operation R described above, the transport device 5 performs a transfer operation T of transferring the fourth article W4 from the transport device 5 to the storage region 12 with use of the first transfer device 61 and a transfer operation T of transferring the third article W3 from the transport device 5 to the storage region 12 with use of the second transfer device 62, although these operations are not illustrated.

(2) In the above embodiment, a configuration is described as an example in which the transport device 5 travels along a travel path that is set in correspondence with each stage in the article storage rack 1. However, the present disclosure is not limited to this configuration, and the transport device 5 may also be a transport device having a different configuration, such as a stacker crane, for example.

Figure 17:
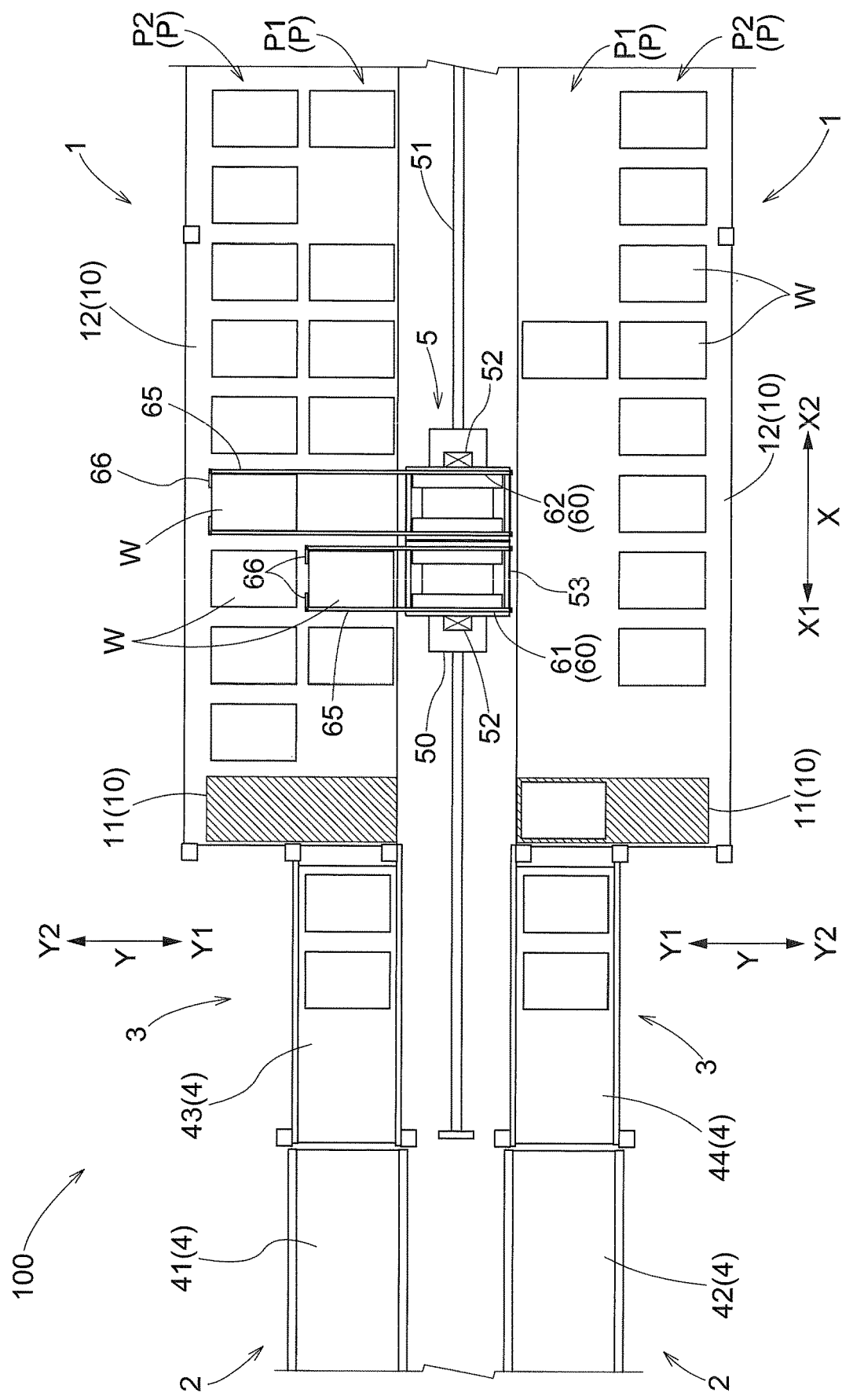
FIG. 17 is a plan view of a portion of the article storage facility according to another embodiment.

FIG. 17 shows an example case in which the transport device 5 is a stacker crane. In the example shown in FIG. 17, a rail 51 that constitutes the travel path of the transport device 5 is installed on a floor section. The transport device 5 includes a travel portion 50 configured to travel in the width direction X by being guided by the rail 51 and a lift body 53 configured to move upward and downward by being guided by a mast 52 standing on the travel portion 50. The transfer devices 60 are supported by the lift body 53, and transfer articles W between the transport device 5 and a storage section 10 in a state where the lift body 53 is moved to a height corresponding to the storage section 10 to which the articles W are to be transferred. Also, in a state where the lift body 53 is moved to a height corresponding to a relay section 3, the transfer devices 60 transfer articles W between the transport device 5 and the relay section 3. In the example shown in FIG. 17, the relay device 4 does not include the first lift device 45 and the second lift device 46, and an article W to be loaded into the article storage rack 1 is transported from the loading/unloading section 2 to the relay section 3 by the first conveyor 41 and the third conveyor 43 in this order, and an article W unloaded from the article storage rack 1 is transported from the relay section 3 to the loading/unloading section 2 by the fourth conveyor 44 and the second conveyer 42 in this order.

(3) In the above embodiment, a configuration is described as an example in which the number of articles W that can be stored next to each other in the depth direction Y in the storage section 10 and the number of transfer devices 60 included in the transport device 5 are both two. However, the present disclosure is not limited to this configuration, and these numbers may also be an integer equal to or larger than three (e.g., three). Also, unlike the above embodiment, the number of articles W that can be stored next to each other in the depth direction Y in the storage section 10 may be different from the number of transfer devices 60 included in the transport device 5. In a configuration in which three or more articles W can be stored next to each other in the depth direction Y in the storage section 10, each control described in the above embodiment is executed by the control device 9 in a case where the second article W2 is stored at a storage position P that is closest to the front side Y1 or a case where no other article W is stored on the front side Y1 of the second article W2.

(4) The configurations disclosed in each of the above embodiments can be applied in combination with configurations disclosed in the other embodiments (the other embodiments described above can also be combined with each other). The embodiments disclosed in the present specification including other configurations are merely examples in all aspects. Accordingly, various modifications can be made as appropriate within a range not departing from the gist of the present disclosure.

SUMMARY OF THE ABOVE EMBODIMENT

The following describes a summary of the article storage facility described above.

An article storage facility includes: an article storage rack including a storage section in which a plurality of articles are storable next to each other in a depth direction; a loading/unloading section that is on a first side in a width direction of the article storage rack relative to the storage section and through which an article is carried in and carried out; a relay device configured to transport an article between the loading/unloading section and a relay section that is between the loading/unloading section and the storage section in the width direction; a transport device configured to travel in the width direction on a front side in the depth direction relative to the storage section and transport an article between the storage section and the relay section; and a control device configured to control operations of the transport device, in which the transport device includes a plurality of transfer devices that are next to each other in the width direction, are capable of transferring articles to the storage section and the relay section, and include a first transfer device and a second transfer device, a region in the storage section on the first side in the width direction is a temporary placement region, and a region in the storage section on a side opposite to the first side in the width direction relative to the temporary placement region is a storage region, the control device is configured to be capable of switching a control mode of the transport device to a specific transfer mode in a case where a first article that is to be unloaded from the article storage rack is arranged next to a second article that is not to be unloaded from the article storage rack, on a rear side of the second article in the storage region, the rear side being opposite to the front side in the depth direction, the specific transfer mode is a mode for causing the transport device to execute a first transfer operation, a travel operation, and a second transfer operation in this order, the first transfer operation is an operation of transferring the second article from the storage region to the transport device with use of the second transfer device, and thereafter transferring the first article from the storage region to the transport device with use of the first transfer device, the travel operation is an operation of traveling to a position corresponding to a boundary between the relay section and the temporary placement region while holding the first article and the second article, and the second transfer operation is an operation of transferring the first article from the transport device to the relay section with use of the first transfer device, and transferring the second article from the transport device to the temporary placement region with use of the second transfer device.

According to this configuration, the control mode of the transport device can be switched to the specific transfer mode in the case where the first article to be unloaded from the article storage rack is arranged next to the second article that is not to be unloaded from the article storage rack, on the rear side of the second article in the storage region of the storage section in the article storage rack. In the specific transfer mode, it is possible to transfer the second article and the first article in this order from the storage section to the transport device, then cause the transport device holding the second article as well as the first article to travel to the position (hereinafter referred to as a "boundary corresponding position") corresponding to the boundary between the relay section and the temporary placement region, and transfer the first article from the transport device to the relay section and transfer the second article from the transport device to the temporary placement region. As described above, in the specific transfer mode, either one of; a position of the transport device for transferring the first article to the relay section; and a position of the transport device for transferring the second article to the temporary placement region can be set as the boundary corresponding position, and the other position can be set to the boundary corresponding position or a position near the boundary corresponding position. Therefore, when compared with a case where the position of the transport device for transferring the second article, which is not to be unloaded, to the storage section (i.e., returning the second article to the storage section) is far from the boundary corresponding position, the transport device can more quickly travel to the position for transferring the first article to the relay section and the time it takes until the first article is carried out to the relay section can be reduced.

Note that, according to this configuration, it is possible to make the temporary placement region basically available for the purpose of temporarily placing the second article in the specific transfer mode by adopting a configuration in which an article carried into the relay section by the relay device (i.e., an article to be loaded into the article storage rack) is carried into the storage region. Furthermore, according to this configuration, the temporary placement region can be provided near the relay section to which the transport device travels every time when loading an article into the article storage rack or unloading an article from the article storage rack. Accordingly, when compared with a case where the second article is temporarily placed at a location that is far from the relay section in the storage section (for example, the storage location where the second article has been stored), it is easy to transport the temporarily placed second article to a desired storage location in the storage section with use of a travel operation of the transport device for loading an article into the article storage rack or unloading an article from the article storage rack. Therefore, the efficiency of transporting articles in the entire facility can be improved.

As described above, according to this configuration, in the case where the first article is arranged next to the second article on the rear side of the second article in the article storage rack, it is possible to reduce the time it takes until the first article is carried out to the relay section while improving the efficiency of transporting articles in the entire facility.

Here, it is preferable that the first transfer device is on the first side in the width direction relative to the second transfer device.

According to this configuration, the order in which the first article and the second article are arranged in the width direction when held by the transport device matches the order in which the relay section, to which the first article is transferred, and the temporary placement region, to which the second article is transferred, are arranged in the width direction. Therefore, when compared with a case where the first transfer device is on the side opposite to the first side in the width direction relative to the second transfer device, the position of the transport device for transferring the first article to the relay section can be made closer to the position of the transport device for transferring the second article to the temporary placement region, and these two positions can also be set to be a common position (the boundary corresponding position described above). Therefore, the time it takes to perform the second transfer operation can be reduced.

In the configuration in which the first transfer device is on the first side in the width direction relative to the second transfer device as described above, it is preferable that a distance in the width direction between the first transfer device and the second transfer device is set according to a distance in the width direction between a transfer location of the first article in the relay section and a transfer location of the second article in the temporary placement region.

According to this configuration, even if the distance in the width direction between the first transfer device and the second transfer device is fixed, the second article and the first article can be transferred in parallel with each other to the temporary placement region and the relay section, respectively, in the second transfer operation. Therefore, the time it takes to perform the second transfer operation can be made short.

Also, in the configuration in which the first transfer device is on the first side in the width direction relative to the second transfer device as described above, it is preferable that a distance in the width direction between the first transfer device and the second transfer device is changeable, and a changeable range of the distance includes: a distance corresponding to a distance in the width direction between a transfer location of the first article in the relay section and a transfer location of the second article in the temporary placement region; and a distance corresponding to a distance in the width direction between two articles that are next to each other in the width direction in the storage region.

According to this configuration, when the distance in the width direction between the first transfer device and the second transfer device is changed to the distance corresponding to the distance in the width direction between the transfer location of the first article in the relay section and the transfer location of the second article in the temporary placement region, the second article and the first article can be transferred in parallel with each other to the temporary placement region and the relay section, respectively, in the second transfer operation. Also, when the distance in the width direction between the first transfer device and the second transfer device is changed to the distance corresponding to the distance in the width direction between two articles next to each other in the width direction in the storage region, the articles can be transferred in parallel with each other between the transport device and the storage region by the first transfer device and the second transfer device, respectively. Therefore, it is possible to efficiently load articles into the article storage rack and unload articles from the article storage rack.

It is sufficient that an article storage facility according to the present disclosure has at least one of the effects described above.

DESCRIPTION OF REFERENCE SIGNS

1: Article storage rack
2: Loading/unloading section
3: Relay section
4: Relay device
5: Transport device
9: Control device
10: Storage section
11: Temporary placement region
12: Storage region
60: Transfer device
61: First transfer device
20 62: Second transfer device
100: Article storage facility
B: Boundary corresponding position (position corresponding to a boundary between the relay section and the temporary placement region)
D1: First distance (distance in the width direction between the first transfer device and the second transfer device)
D2: Second distance (distance in the width direction between a transfer location of the first article in the relay section and a transfer location of the second article in the temporary placement region)
D3: Third distance (distance in the width direction between two articles next to each other in the width direction in the storage region)
R0: Specific travel operation (travel operation)
T1: First transfer operation
T2: Second transfer operation
W: Article
W1: First article
W0: Second article
X: Width direction
X1: First side in the width direction
Y: Depth direction
Y1: Front side
Y2: Rear side

The invention claimed is:

1. An article storage facility comprising:
an article storage rack comprising a storage section in which a plurality of articles are storable next to each other in a depth direction;
a loading/unloading section that is on a first side in a width direction of the article storage rack relative to the storage section and through which an article is carried in and carried out;
a relay device configured to transport an article between the loading/unloading section and a relay section that is between the loading/unloading section and the storage section in the width direction;
a transport device configured to travel in the width direction on a front side in the depth direction relative to the storage section and transport an article between the storage section and the relay section; and
a control device configured to control operations of the transport device,
wherein:
the transport device comprises a plurality of transfer devices that are next to each other in the width direction, are capable of transferring articles to the storage section and the relay section, and comprise a first transfer device and a second transfer device, a region in the storage section on the first side in the width direction is a temporary placement region, and a region in the storage section on a side opposite to the first side in the width direction relative to the temporary placement region is a storage region, the control device is configured to switch a control mode of the transport device to a specific transfer mode in a case where a first article that is to be unloaded from the article storage rack is arranged next to a second article that is not to be unloaded from the article storage rack, on a rear side of the second article in the storage region, the rear side is opposite to the front side in the depth direction, the specific transfer mode is a mode for causing the transport device to execute a first transfer operation, a travel operation, and a second transfer operation in this order, the first transfer operation is an operation of transferring the second article from the storage region to the transport device with use of the second transfer device, and thereafter transferring the first article from the storage region to the transport device with use of the first transfer device, the travel operation is an operation of traveling to a position corresponding to a boundary between the relay section and the temporary placement region while holding the first article and the second article, and the second transfer operation is an operation of transferring the first article from the transport device to the relay section with use of the first transfer device, and transferring the second article from the transport device to the temporary placement region with use of the second transfer device.

2. The article storage facility according to claim 1, wherein the first transfer device is on the first side in the width direction relative to the second transfer device.

3. The article storage facility according to claim 2, wherein a distance in the width direction between the first transfer device and the second transfer device is set according to a distance in the width direction between a transfer location of the first article in the relay section and a transfer location of the second article in the temporary placement region.

4. The article storage facility according to claim 2, wherein a distance in the width direction between the first transfer device and the second transfer device is changeable, and a changeable range of the distance includes: a distance corresponding to a distance in the width direction between a transfer location of the first article in the relay section and a transfer location of the second article in the temporary placement region; and a distance corresponding to a distance in the width direction between two articles that are next to each other in the width direction in the storage region.

* * * * *